United States Patent [19]

Eriksen

[11] Patent Number: 5,734,393
[45] Date of Patent: Mar. 31, 1998

[54] INTERLEAVED INTERLACED IMAGING

[75] Inventor: Joern B. Eriksen, Oregon City, Oreg.

[73] Assignee: Tektronix, Inc., Wilsonville, Oreg.

[21] Appl. No.: 509,844

[22] Filed: Aug. 1, 1995

[51] Int. Cl.$^6$ ............... B41J 2/115; B41J 2/15; B41J 29/38

[52] U.S. Cl. ............... 347/41; 347/12

[58] Field of Search ............... 347/41, 43, 12, 347/74, 40

[56] References Cited

U.S. PATENT DOCUMENTS

| | | | |
|---|---|---|---|
| 4,232,324 | 11/1980 | Tsao | 347/41 |
| 4,272,771 | 6/1981 | Furukawa | 347/12 |
| 4,967,203 | 10/1990 | Doan et al. | |
| 4,999,646 | 3/1991 | Trask | |
| 5,059,984 | 10/1991 | Moore et al. | 347/41 |
| 5,070,345 | 12/1991 | Lahut et al. | |
| 5,075,689 | 12/1991 | Hoisington et al. | |
| 5,170,416 | 12/1992 | Goetz et al. | |
| 5,239,312 | 8/1993 | Merna et al. | |
| 5,300,950 | 4/1994 | Lopez et al. | |
| 5,300,957 | 4/1994 | Burke | |

FOREIGN PATENT DOCUMENTS 0476860  3/1992  European Pat. Off. ......... B41J 2/205

Primary Examiner—Benjamin R. Fuller
Assistant Examiner—Thinh Nguyen
Attorney, Agent, or Firm—Ralph D'Alessandro; Charles F. Moore

[57] ABSTRACT

An ink-jet printer that prints using an interlace ratio of higher than 2:1. The print head has an internozzle spacing of N, while the interlace ratio n:1 is selected so that n is an integer divisor of N+2 or N+4 or is equal to N+1. Multiple interlaced images can be "stitched" together by printing a first interlaced image, moving the print head and printing a second interlaced image such that the head of the second image overlaps with the tail of the first interlaced image.

23 Claims, 4 Drawing Sheets

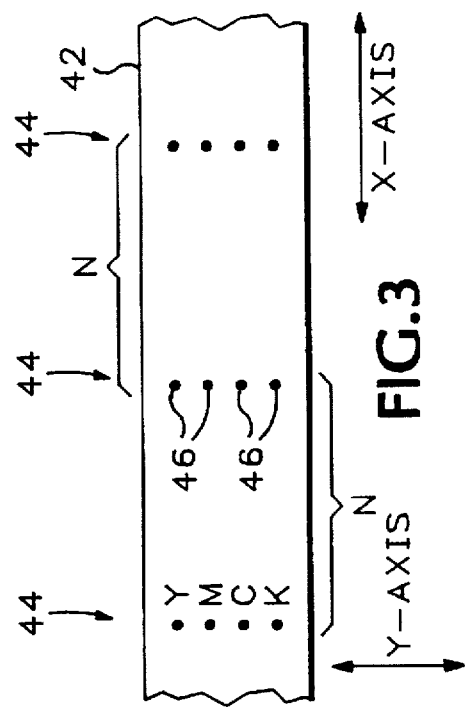
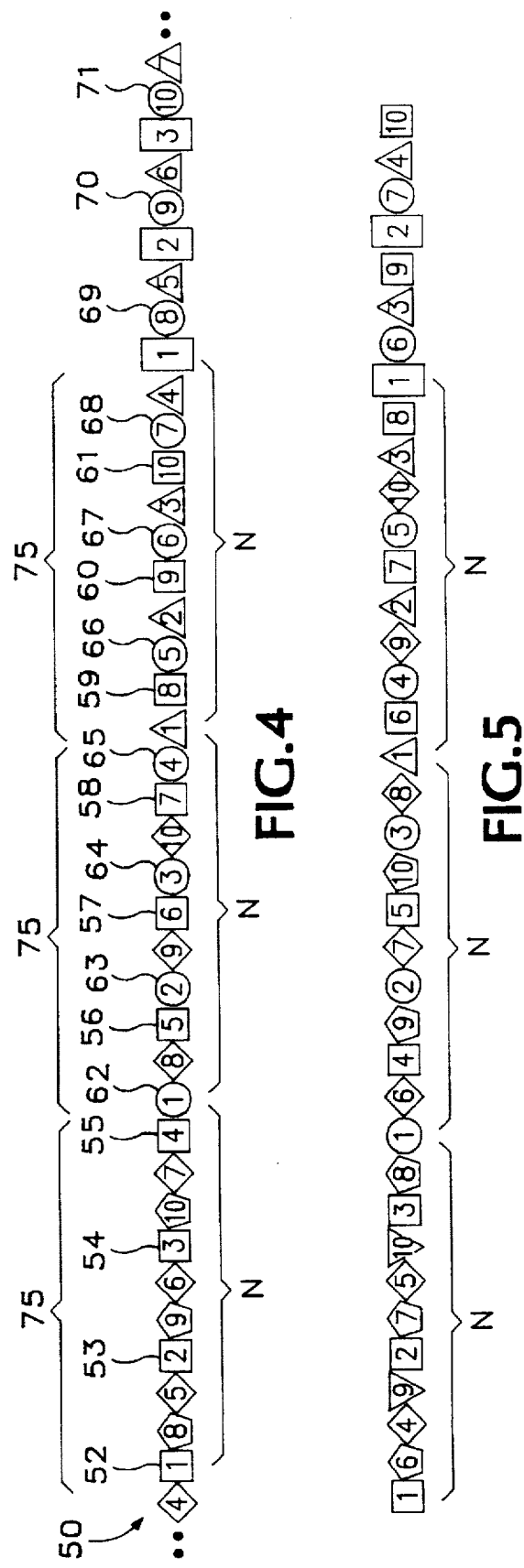
FIG.3
FIG.4
FIG.5

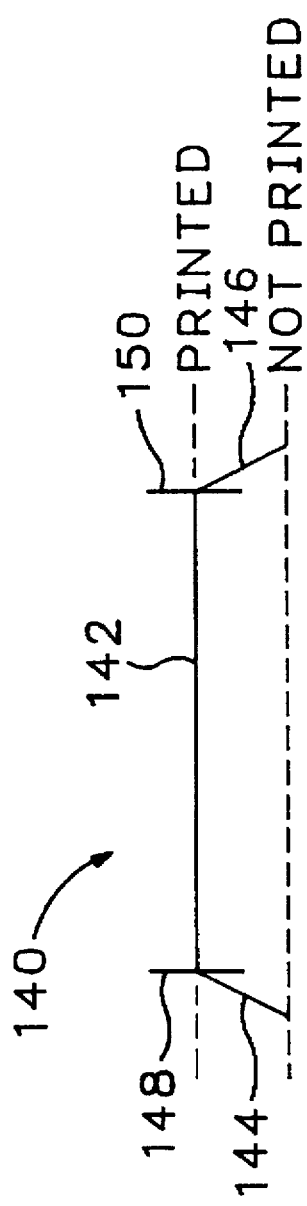
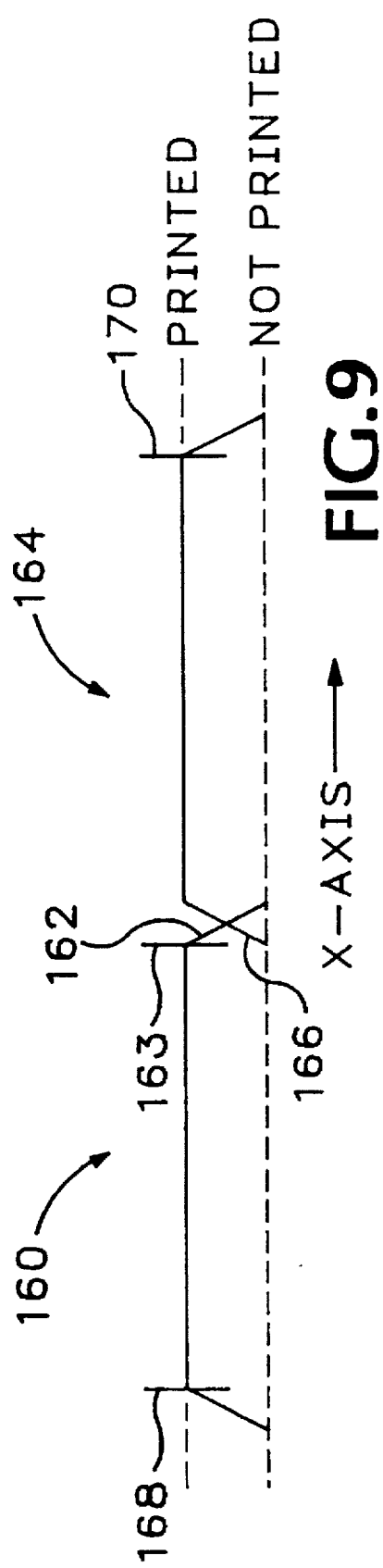

INTERLEAVED INTERLACED IMAGING

TECHNICAL FIELD

This invention relates to raster printers, and more particularly to an apparatus and method for interlacing ink drops forming printed scan lines from multiple nozzles onto a transfer surface on media to improve print quality and minimize print artifacts and to join adjacent interlaced images to form a larger interlaced image.

BACKGROUND ART

The field of ink-jet printing is replete with references describing solutions to problems associate with placing ink drops on a print medium. In particular, color ink-jet printing requires careful placement of ink drops to meet print resolution and color fidelity requirements without producing undesired printing artifacts.

Ink drop placement-related problems vary in severity with a large number of printer-related variables including desired printing speed, print head array configurations, transfer versus direct printing, aqueous versus phase change ink, the printing resolution required, print postprocessing employed, if any, and the type of print medium employed.

Many prior print interlacing methods and print head nozzle array patterns are known because of the correspondingly wide variety of nozzle array configurations, ink types, print media supports, print head and media movement mechanisms employed by ink-jet printers.

Line interlacing entails printing adjacent lines of dots of a particular color during sequential scans of the print head. For example, lines 1, 3, 5, etc., are printed during first scan, and lines 2, 4, 6, etc., are printed during the next scan.

Printing artifacts can also be caused by variations between the nozzles on the print head. The nozzles must behave similarly and consistently to produce uniform shades and solid fills. Differences in drop mass, nozzle aim, and timing can result in degraded image quality.

Print head consistency can be improved by a process called "normalization." During normalization, the performance of each nozzle on the print head is measured. An adjustable driver circuit is associated with each nozzle. As part of the normalization process, parameters of the individual driver circuits are modified to bring each nozzle's performance within an acceptable range.

SUMMARY OF THE INVENTION

The present invention further provides a method and apparatus for printing and joining together by interleaving or stitching together component interlaced images to form a combined interlaced image.

This invention has the advantages of permitting images of width greater than the print head to be printed without substantially noticeable seams where the portions of the image are overlapped.

The present invention also can be employed with a method and an apparatus that provides interlaced printing at an increased interlace ratio.

Generally, the method of the present invention includes printing an interlaced image such that bands in the printed image include the outputs from at least three different nozzles. Any disparity in performance between the different nozzles is effectively eliminated by the visual averaging of their outputs.

At interlace ratios of 4:1 and 6:1 print head normalization and the concomitant separate and individual driver voltages for each nozzle may be eliminated.

In a preferred printer of the invention, a drum driver rotates the drum about a drum axis, causing Y-axis, or scanning, motion. A single rotation of the drum equals a single scan. A carriage servo moves a print head along the length of the drum along the X-axis with a slewing motion. The relative speeds of the drum rotation and carriage is controlled such that the print head lays down scan lines of ink drops on the drum in an interlaced fashion. In this manner there is the desired spacing between the adjacent scan lines of ink drops to achieve uniform color shading and secondary color solid area fills without printing artifacts such as banding.

According to a further preferred method of the present invention, the interlace ratio is divisible by two, enabling adjacent scan lines to be paired, further decreasing print artifacts.

It is another feature of the present invention that the interlacing method is especially useful in imaging with solid or phase change ink printing.

It is an advantage of the present invention that a method of interlacing a printed image is provided that removes the need to normalize the print head during manufacturing, thereby saving time and cost in the manufacturing process.

It is another advantage of the present invention that uniform shades and solid area fills are achieved in printing without undesirable printing artifacts, such as banding.

These and other aspects, features and advantages of the present invention are obtained by the apparatus and method of using that apparatus by laying down scan lines of ink drops in an interlaced fashion that improves print quality. Two interlaced images can be interleaved or stitched together to from a wide format image.

BRIEF DESCRIPTION OF THE DRAWINGS

The aspects, features and advantages of the invention will become apparent upon consideration of the following detailed disclosure of the invention, especially when it is taken in conjunction with the accompanying drawings wherein:

FIG. 3 is an enlarged face view of a portion of the print head of FIG. 2;

FIG. 4 is an illustration of the printing method of the printer of FIG. 1, showing the impact locations of one or more nozzles in the same column for adjacent columns of nozzles during consecutive rotations of the transfer drum, with an internozzle spacing of 10 scan lines and a 3:1 interlace ratio;

FIG. 5 is an illustration of the printing method of the printer of FIG. 1, showing the impact locations of one or more nozzles in the same column for adjacent columns of nozzles during consecutive rotations of the transfer drum, with an internozzle spacing of 10 scan lines and a 4:1 interlace ratio;

FIG. 8 is a simplified illustration of an interlaced image showing its head and tail; and FIG. 9 is a simplified illustration of stitching or interleaving together two component interlaced images to form a combined interlaced image.

DETAILED DESCRIPTION OF THE INVENTION

Figure 1:
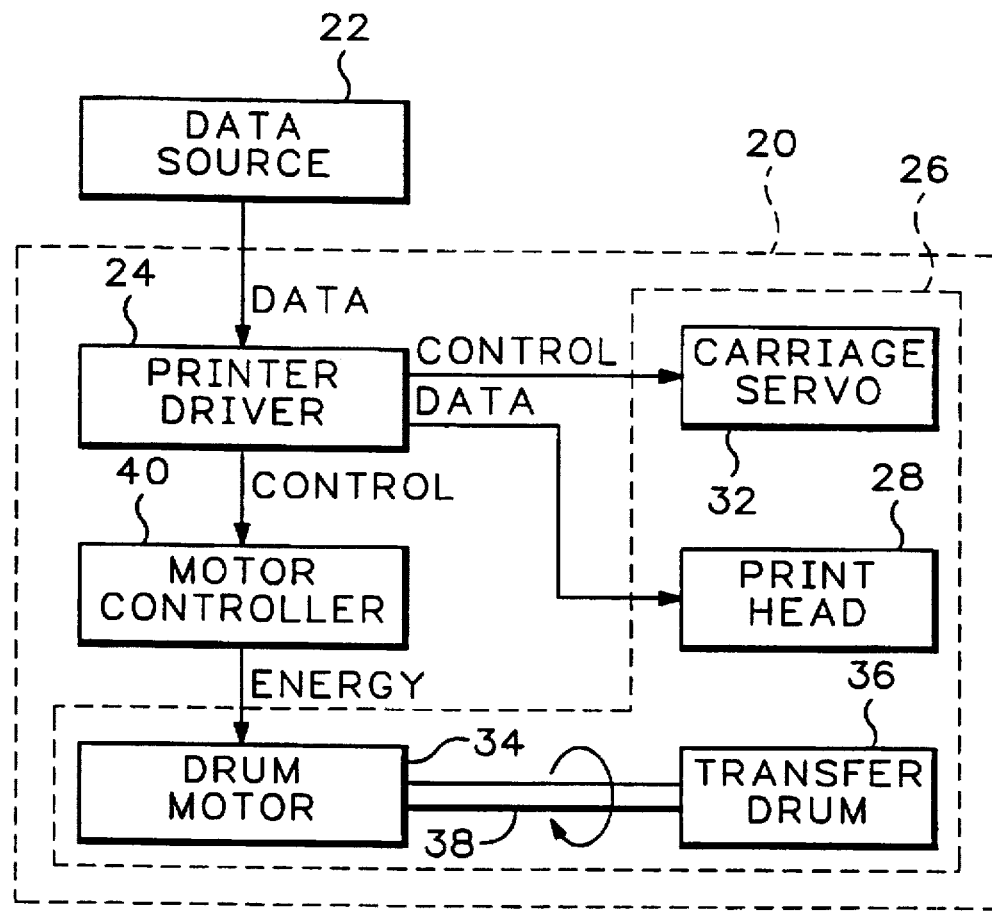
FIG. 1 is a general block diagram illustrating a printer made according to the present invention.

Referring now to FIG. 1, an exemplary printer 20 made according to the present invention is shown. Printer 20 receives scan data from a data source 22. This data defines the colors to be printed at each pixel location on a predetermined image area of a print medium.

Figure 2:
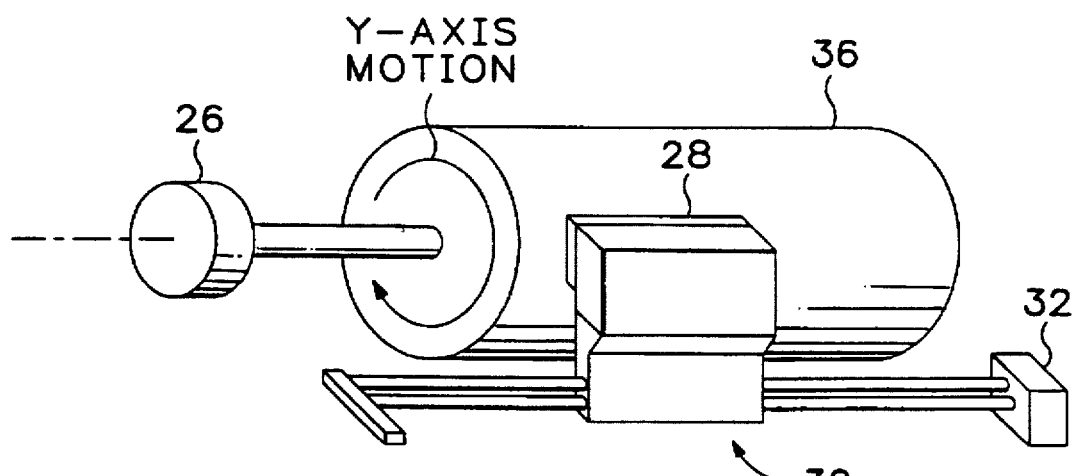
FIG. 2 is a perspective view of an exemplary print head and associated transfer drum of the printer of FIG. 1.

A printer driver 24 within printer 20 receives the data and, in response, controls operation of print engine 26. Control includes feeding formatted data to a print head 28, the movement of which is provided by a carriage 30, shown in FIG. 2, controlled by a carriage servo 32. A motor 34 rotates transfer drum 36 about an axis 38. Motor 34 is controlled by a motor controller 40 receiving control data from printer driver 24.

Print head 28 prints an image on transfer drum 36. When the image for a sheet of print medium (not shown) is fully printed on transfer drum 36, the sheet is brought in contact with transfer drum 36, transferring the deposited image to the sheet.

The image receiving portion of transfer drum 36 may be wider than array of nozzles on print head 28.

FIG. 3 illustrates a portion of a face 42 of print head 28 having parallel columns 44 of ink jet nozzles 46. Each column 44 includes a black, cyan, yellow, and magenta ink jet nozzle 46. Columns 44 are arranged in line with the relative scanning motion between print head 28 and transfer drum 36, allowing ink droplets from a single column 44 to overlay each other during a single scan.

The internozzle spacing N between adjacent columns 44 as seen in FIG. 3 may be selected based on criteria not relevant to the present invention. These criteria includes the minimum size of the nozzles and supporting structure, desired print resolution, print speed, and cost. As described below, certain internozzle spacings N provide a wider range of possible interlace options and thus may be preferred.

The internozzle spacing N dictates the number of scans, and thus rotations of transfer drum 36 that must occur, to print a complete image. A print head 28 having an internozzle spacing of N requires N scans with N−1 respective steps between the scans.

In practice, carriage servo 32 moves print head 28 a constant slew speed while transfer drum 36 rotates. With 300 scan lines per inch (118 scan lines per centimeter) and an interlace of 6:1, this results in an image skewed by 0.02 inches (78.7 μm) over its complete length. Smaller interlace ratios and higher resolutions result in decreased skewing of the image.

Because even slight offsets or inconsistencies in the placement of adjacent scan lines results in readily noticeable print artifacts, carriage servo 32 must be able to precisely locate print head 28.

FIG. 4 illustrates the method of practicing the present invention with print head 28 having an internozzle spacing N of 10 scan lines and a 3 to 1 (3:1) interlace ratio. The row 50 of adjacent symbols represents the adjacent scan lines that are printed by print head 28. All symbols having the same shape and orientation represent scan lines that are printed by the same column 44 of nozzles 46 of FIG. 3. The number within each symbol represents the number of the scan during which the scan line is printed.

Therefore, scan lines 52–61 are printed by the same column of nozzles on consecutive rotations of transfer drum 36. Similarly, scan lines 62–71 are printed by another column of nozzle. Furthermore, scan line 52 is printed at the same time as scan line 62. The column of nozzles that prints scan lines 62–71 is adjacent to the column of nozzles that prints scan lines 52–61. Thus, the distance between scan line 52 and scan line 62 is equal to the internozzle distance or spacing N, see FIG. 4.

An alternative representation of this interlace pattern is the numeric step sequence of print head 28 between scans. For the 3:1 interlace of FIG. 4, the step pattern is 3, 3, 3, 3, 3, 3, 3, 3, 3.

FIG. 4 shows that the 3:1 interlaced image has bands 75 that are composed of the scan lines from three different nozzles 46. Bands 75 have a width equal to the internozzle spacing N. The larger the number of nozzles involved in making any small region of the image the less the sensitivity to variation in dropmass from the nozzles, and thus less printing artifacts.

FIG. 5 illustrates the method of practicing the present invention with another print head 28 having the same internozzle spacing N of 10 scan lines but using a 4:1 interlace ratio.

The step pattern for this interlace pattern is 4, 4, 4, 4, 5, 4, 4, 4, 4. Thus, all steps are the same except for the middle step, which is one greater than the others. This extra scan line movement must occur when print head 28 is not printing on transfer drum 36, which occurs once per rotation of transfer drum 36.

With a 4:1 interlace ratio, each band of the interlaced image is composed from the output of four different nozzles. This increased interlace ratio further reduces the sensitivity to variation in dropmass between nozzles.

Furthermore, because a 4:1 interlace ratio has an even number for its step, scan line pairing can be used to further improve image quality. That is, the first one-half of the scans results in every other scan line being deposited. The middle step is increased by one, from 4 to 5, so that the print head 28 can print the remaining scan lines. By adjusting the middle step to a value slightly different from an integer scan line distance, all subsequently printed scan lines will not be equidistant from both of their adjacent scan lines, but rather moved closer, or "paired," with one of their adjacent scan lines. This pairing results in a noticeable decrease in printing artifacts.

Figure 6:
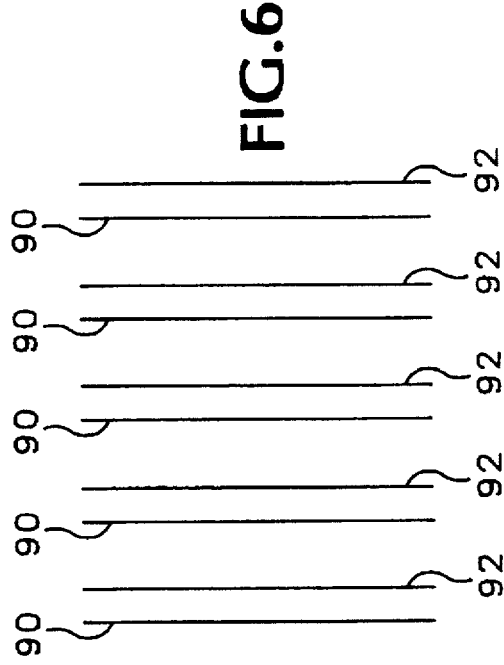
FIG. 6 is an illustration of scan line pairing.

FIG. 6 shows a simplified view of scan line pairing. Scan lines 90 represent the first set of scan lines to be printed. Scan lines 92 represent the second set of interlaced scan lines to be printed. It has been experimentally determined that a distance of 0.8 to 0.5 pixel widths between paired scan lines (where the distance between a scan line and the second following scan line is 2 pixel widths) or the second set of scan lines are offset an additional 0.2 to 0.5 pixel widths from the pixel integer position is preferred. The pixel integer position is the position midway between the 2 pixel widths separating the scan line and the second following scan line.

Scan line pairing of interlaced images is addressed in more detail in a copending application Ser. No. 08/381,615, entitled "Pairing of Ink Drops on a Print Medium," filed Jan. 30, 1995, which is hereby incorporated by reference, and which has a common assignee.

The examples of FIGS. 4 and 5 have an internozzle spacing N of 10. This spacing was intentionally chosen this small to ease the graphical illustrating of the interlace pattern. Due to size constraint of print head 28, a typical internozzle spacing is significantly larger.

One typical implementation of print head 28 has an internozzle spacing N of 28, and prints at a resolution of 300 dots per inch. A 4:1 interlace can be implemented with a stepping pattern of 4, 4, 4, 4, 4, 4, 6, 4, 4, 4, 4, 4, 4, 5, 4, 4, 4, 4, 4, 4, 6, 4, 4, 4, 4, 4, 4.

The same print head 28 having an internozzle spacing N of 28 can implement a 6:1 interlace using a stepping pattern of 6, 6, 6, 6, 6, 6, 6, 6, 6, 6, 6, 6; 6, 7, 6, 6, 6, 6, 6, 6, 6, 6, 6, 6, 6, 6, 6.

A different print head 28 having an internozzle spacing N of 22 can print a 4:1 interlaced image with a stepping pattern of 4, 4, 4, 4, 4, 4, 4, 4, 4, 4, 5, 4, 4, 4, 4, 4, 4, 4, 4, 4, 4.

A preferred value of interlace ratio $n_1$ can be selected where $n_1$ is an integer divisor of N+2, where N is the internozzle spacing. Thus, if N is 28, then N+2 is 30 and $n_1$ can be any of 2, 3, 5, 6, 10, 15. If N is 22, then N+2 is 24 and $n_1$ can be any of 2, 3, 4, 6, 8, 12. These possible interlace values require the center step of their respective stepping patterns to be increased by only one. The N=10, 4:1 interlace example given above, as well as the N=28, 6:1 interlace, and the N=22, 4:1 interlace are all examples of preferred values $n_1$.

Less desirable, but still acceptable, values of possible interlace ratio $n_2$ can be selected where $n_2$ is an integer divisor of N+4. Thus, if N is 28, then N+4 is 32 and $n_2$ can be either 4 or 8. If N is 22, then N+4 is 26 and $n_2$ can only be 13. Ratio values $n_2$ are less desirable than those ratio values $n_1$ in that values $n_2$ require at least one step in the step pattern that is two greater than $n_2$. The N=28, 4:1 interlace example given above is an example of an interlace ratio $n_2$.

Yet another possible interlace ratio $n_3$ is possible where $n_3$ is N+1. Such a high interlace ratio can require relatively large movements of print head 28 for large internozzle spacing N.

Increasing the interlace ratio n above 2:1 has the effect of decreasing printing artifacts caused by disparities in the dropmass of adjacent nozzles. Increasing the number of nozzles that participate in creating a portion of an image decreases the sensitivity to any one nozzle. However, if the interlace ratio gets too large, the spatial band frequency becomes sufficiently small to become noticeable, detracting from image quality. With 300 dots per inch resolution (118 dots cm−1), optimum interlace ratio appears to be either 4:1 or 6:1.

Figure 7:
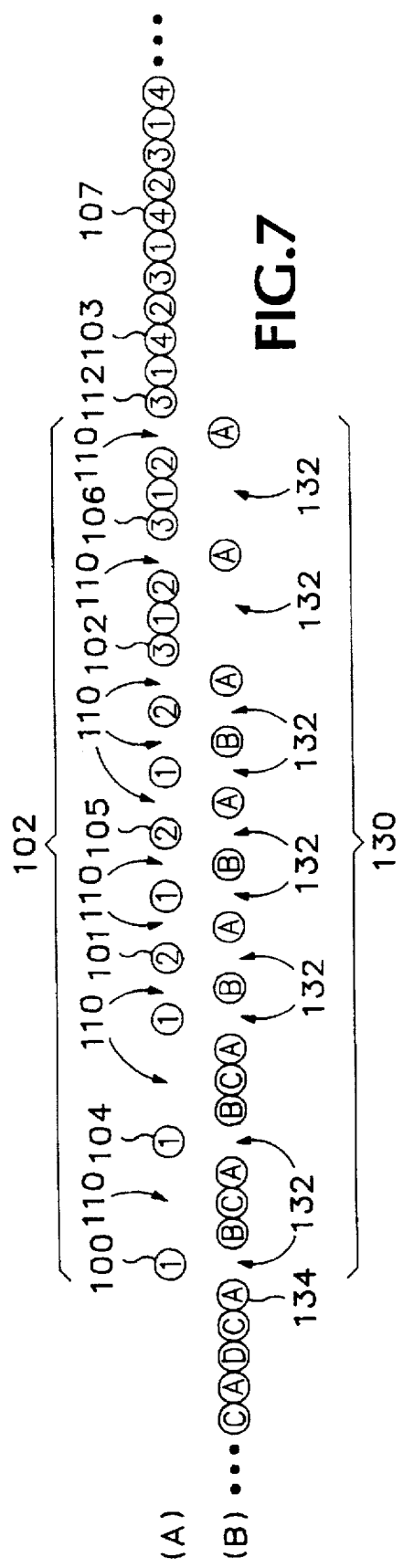
FIG. 7 is an illustration of stitching or interleaving together two interlaced images having an internozzle spacing of 10 scan lines and a 4:1 interlace ratio.

Care must be taken when printing the edges of an interlaced image when the interlace ratio n is greater than two. FIG. 7 illustrates the edges of an interlaced image where the internozzle distance N is 10 and the interlace ratio n is 4:1.

Row (A) illustrates the results of printing using all of the columns 44 of nozzles 46 on print head 28. Each circle represents a scan line of the image, with the numbers contained in the circles indicating the number of the column 44 that prints the ink drops that form the scan line. Print head 28 slews in the X-axis direction during printing. As drawn, scan lines containing a "1" are the printed by the leftmost column 44 of nozzles 46 printing the interlaced image. Scan lines 100, 101, 102, and 103 print during the first scan; scan lines 104, 105, 106, and 107 print during the second scan, and so on. The majority of the interlaced image extends to the right of the scan lines illustrated in Row (A).

The resulting interlaced image has gaps 110 in it and is not fully filled until scan line 112. The print region containing gaps 110 at the beginning of printing is termed a "head" 120 for the purpose of explanation in this document. Gaps 110 in head 120 would normally be considered to be unacceptable in a printed image. To avoid the gaps, the leftmost edge of the interlaced image is mapped to scan line 112; no scan lines to the left of scan line 112 are then printed.

At the other end of print head 28 a similar situation can occur, resulting in a "tail" 130 as seen still in FIG. 7. Row (B) illustrates tail 130, with the majority of the interlaced image extending to the left. To avoid gaps 132 in tail 130, the rightmost edge of the interlace image cannot go beyond scan line 134.

FIG. 8 shows a simplified view of an interlaced image along the X-axis, showing the fully filled region 142. The head 144 and tail 146 are simply represented as ramps. By confining the output of print head 28 to between scan lines 148 and 150, the gaps can be avoided.

Returning to FIG. 7, it can be seen that gaps 110 of head 120 perfectly match the printed scan lines in tail 130. A "combined" interlaced image may be interleaved or "stitched" together from two "component" interlaced images by overlapping their respective head 120 and tail 130.

FIG. 9 shows a simplified representation of stitching together two component interlaced images to result in a wider combined interlaced image. Printing a combined interlaced image substantially wider than print head 28 can be achieved according to the present invention by printing a first component interlaced image 160 having a tail 162, moving print head 28 to the beginning 163 of the tail 162 and then printing a second component interlace image, starting with its head 166. The resulting combined image can be mapped between a first scan line 168 in the first component image 160 and a second scan line 170 in the second component image 134. The combined image need not be the full width available between first and second scan lines 168, 170.

It will be recognized that the column of nozzles that prints the head 166 of the second component interlaced image 164 need not be adjacent to an end of print head 28. If the width of the desired combined interlaced image is less than twice the maximum width of a single component interlaced image printable by print head 28, then print head 28 need only be moved enough between prints of component images to accommodate printing the edge of the combined image. Not all columns 44 of nozzles 46 will be used in printing the second component interlaced image 164. If desired, both the first and second component images may be decreased in width such that their head and tail overlap in the center of the image.

Furthermore, it will be recognized that a combined interlaced image can comprise more than two component interlaced images.

The terms and expressions which have been employed in the foregoing specification are used therein as terms of description and not of limitation, and there is no intention, in the use of such terms and expressions, of excluding equivalents of the features shown and described, or portions thereof, it being recognized the scope of the invention is defined and limited only by the claims which follow.

What is claimed is:

1. A method for printing a composite interlaced image having at least two component interlaced images, the method comprising the steps of:

printing a first component interlaced image having a first set of a plurality of gaps, the first set of gaps having differing pixel widths and being positioned within a first set of printed pixel locations, the first set of gaps and the first set of printed pixel locations comprising a tail; and printing a second component interlaced image having a second set of a plurality of gaps, the second set of gaps having differing pixel widths and being positioned within a second set of printed pixel locations, the second set of gaps and the second set of printed pixel locations comprising a head, wherein printing the second component interlaced image includes interleaving the first set of gaps of said tail with the second set of printed pixel locations in said head, and interleaving the second set of gaps of said head with the first set of printed pixel locations of said tail to form a composite interlaced image.

2. The method of claim 1, wherein said steps of printing the first component interlaced image and printing the second component interlaced image further comprise the first and second component interlaced images having an interlace ratio of at least 3:1.

3. A method for printing a composite interlaced image having at least a first component interlaced image and a second component interlaced image, said method performed by an ink-jet printer having a print head and a print medium that undergo relative movement, said print head having a plurality of print nozzles spaced apart by N pixel widths, said method comprising the steps of:

(a) printing a first set of scan lines in the first component interlaced image using said plurality of print nozzles;

(b) moving said print head relative to said print medium a distance of n pixel widths;

(c) printing another set of scan lines interlaced with the first set of scan lines using said plurality of print nozzles;

(d) repeating steps (b) and (c) until the first component interlaced image having a tail is completed;

(e) moving said print head to a desired location of said second component interlaced image;

(f) printing a first set of scan lines in the second component interlaced image using said plurality of print nozzles; and (g) repeating steps (b) and (c) until said second component interlaced image having a head is completed, where said tail of said first component interlaced image interleaves with said head of said second component interlaced image.

4. The method of claim 3, wherein the step (b) further comprises n being greater than 2.

5. The method of claim 3, wherein the step (b) further comprises n being an integer divisor of N+2.

6. The method of claim 3, wherein the step (b) further comprises n being an integer divisor of N+4.

7. The method of claim 3, wherein the step (b) further comprises n being N+1.

8. The method of claim 3, wherein the step (b) further comprises n being an even number.

9. The method of claim 8, wherein the steps (a), (c) and (f) include printing pairs of adjacent scan lines in said composite interlaced image at spacings within a range of 0.8 to 0.5 pixel widths.

10. The method of claim 9, further comprising a step of moving said print head an additional distance of 0.2 to 0.5 pixels after one-half of each component interlaced image is printed.

11. The method of claim 3, wherein steps (b) and (c) occur simultaneously.

12. The method of claim 1, wherein the steps of printing the first component interlaced image printing the second component interlaced image further comprise the first and second component interlaced images having an interlace ratio of 4:1.

13. The method of claim 1, wherein the steps of printing the first component interlaced image and printing the second component interlaced image further comprise the first and second component interlaced images having an interlace ratio of 6:1.

14. The method of claim 1, wherein the steps of printing the first component interlaced image and printing the second component interlaced image further comprise the first and second component interlaced images having an interlace ratio of 8:1 or greater.

15. The method of claim 1, wherein the steps of printing the first component interlaced image and printing the second component interlaced image further comprise at least one gap in each of the first and second sets of a plurality of gaps being positioned between printed pixel locations that are addressed by the same column of ink jet nozzles.

16. The method of claim 15, wherein the steps of printing the first component interlaced image and printing the second component interlaced image further comprise at least one gap in each of the first and second sets of a plurality of gaps having a width of at least two pixel widths in an X-axis direction.

17. The method of claim 16, wherein the steps of printing the first component interlaced image and printing the second component interlaced image further comprise at least one pair of adjacent gaps in each of the first and second sets of a plurality of gaps being separated by at least two pixel widths in an X-axis direction.

18. The method of claim 17, wherein the steps of printing the first component interlaced image and printing the second component interlaced image further comprise printing the first component interlaced image and the second component interlaced image using scan line pairing.

19. The method of claim 18, wherein the steps of printing the first component interlaced image and printing the second component interlaced image further comprise printing paired scan lines in the first component interlaced image and the second component interlaced image at spacings within a range of 0.8 to 0.5 pixel widths.

20. The method of claim 19, wherein the steps of printing the first component interlaced image and printing the second component interlaced image further comprise printing the first component interlaced image and the second component interlaced image on a transfer drum.

21. The method of claim 20, wherein the steps of printing the first component interlaced image and printing the second component interlaced image further comprise transferring the first component interlaced image and the second component interlaced image from the transfer drum to a print medium.

22. The method of claim 19, wherein the steps of printing the first component interlaced image and printing the second component interlaced image further comprise printing the first component interlaced image and the second component interlaced image directly onto a print medium.

23. A method for printing a composite interlaced image having at least a first component interlaced image and a second component interlaced image, said method performed by an ink-jet printer having a print head and a print medium that undergo relative movement, said print head having a plurality of print nozzles spaced apart by N pixel widths, said method comprising the steps of:

(a) printing a first set of scan lines using said plurality of print nozzles;

(b) moving said print head relative to said print medium a distance of n pixel widths;

(c) printing a second set of scan lines using said plurality of print nozzles, said second set of scan lines being interlaced with said first set of scan lines;

(d) completing the first component interlaced image having a tail by repeating steps (b) and (c) a plurality of times;

(e) moving said print head to a desired location of the second component interlaced image;

(f) printing a third set of scan lines using said plurality of print nozzles;

(g) moving said print head relative to said print medium a distance of n pixel widths;

(h) printing a fourth set of scan lines using said plurality of print nozzles, said fourth set of scan lines being interlaced with said third set of scan lines; and (i) completing the second component interlaced image having a head by repeating steps (g) and (h) a plurality of times, where said tail of said first component interlaced image interleaves with said head of said second component interlaced image.

* * * * *